United States Patent
Qin et al.

(10) Patent No.: US 10,560,008 B2
(45) Date of Patent: Feb. 11, 2020

(54) BRUSHLESS DIRECT CURRENT ELECTRIC MOTOR AND ELECTRIC POWER STEERING SYSTEM

(71) Applicant: Johnson Electric S.A., Murten (CH)

(72) Inventors: Rui Feng Qin, Hong Kong (CN); Chuang Yu, Shenzhen (CN); Ning Sun, Shenzhen (CN); Kai Wu, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 961 days.

(21) Appl. No.: 14/952,357

(22) Filed: Nov. 25, 2015

(65) Prior Publication Data

US 2016/0149476 A1    May 26, 2016

(30) Foreign Application Priority Data

Nov. 26, 2014    (CN) .......................... 2014 1 0705241

(51) Int. Cl.

| H02K 16/04 | (2006.01) |
|---|---|
| B62D 5/04 | (2006.01) |
| H02K 16/00 | (2006.01) |
| H02P 25/22 | (2006.01) |

(52) U.S. Cl.
CPC .......... *H02K 16/04* (2013.01); *B62D 5/0421* (2013.01); *H02K 16/00* (2013.01); *H02P 25/22* (2013.01)

(58) Field of Classification Search
CPC ...... H02K 16/00; H02K 16/04; B62D 5/0421; H02P 25/22

USPC .......................... 310/112, 179, 184, 198, 210
See application file for complete search history.

(56) References Cited

U.S. PATENT DOCUMENTS

| 4,672,251 | A | * | 6/1987 | Broadway | .............. | H02K 17/14 |
| | | | | | | 310/184 |
| 6,281,609 | B1 | * | 8/2001 | Itami | .................... | G02B 26/121 |
| | | | | | | 310/179 |
| 2005/0029890 | A1 | * | 2/2005 | Kadoya | .................... | B60K 6/26 |
| | | | | | | 310/180 |

(Continued)

FOREIGN PATENT DOCUMENTS

| CN | 102035271 A | 4/2011 |
| CN | 102195370 A | 9/2011 |

(Continued)

*Primary Examiner* — Mang Tin Bik Lian
*Assistant Examiner* — Rashad H Johnson
(74) *Attorney, Agent, or Firm* — Muncy, Geissler, Olds & Lowe, P.C.

(57) ABSTRACT

A brushless direct current electric motor includes a first sub-motor and a second sub-motor. The first sub-motor and the second sub-motor share a common rotor, and each comprises an independent stator. The stators of each sub-motor comprises a plurality of teeth and a plurality of windings. The teeth of the first sub-motor and the teeth of the second sub-motor are interleavingly arranged in a circumferential direction or arranged side by side in an axial direction. The first sub-motor and the second sub-motor are configured to cooperatively work as a single electric motor to output a normal power. When one of the sub-motors breaks down, the other sub-motor can be operated independently to enhance reliability and safety of the brushless direct current electric motor.

18 Claims, 17 Drawing Sheets

(56) References Cited

U.S. PATENT DOCUMENTS

| | | | | |
|---|---|---|---|---|
| 2007/0278890 | A1* | 12/2007 | Huang | H02K 3/28 |
| | | | | 310/211 |
| 2009/0128076 | A1* | 5/2009 | Taniguchi | H02P 25/22 |
| | | | | 318/400.41 |
| 2009/0133956 | A1* | 5/2009 | Itoh | B62D 5/0403 |
| | | | | 180/446 |
| 2010/0096943 | A1* | 4/2010 | Yamaguchi | H02K 3/28 |
| | | | | 310/195 |
| 2010/0289373 | A1* | 11/2010 | Nishiyama | H02K 3/28 |
| | | | | 310/195 |
| 2013/0214630 | A1* | 8/2013 | Ombach | H02K 3/28 |
| | | | | 310/152 |
| 2013/0234553 | A1* | 9/2013 | Kusase | H02K 16/02 |
| | | | | 310/114 |
| 2014/0145547 | A1* | 5/2014 | Nakano | H02K 21/16 |
| | | | | 310/216.069 |
| 2014/0207335 | A1* | 7/2014 | Mikamo | B62D 5/046 |
| | | | | 701/41 |
| 2015/0280502 | A1 | 10/2015 | Hirotani et al. | |
| 2016/0072416 | A1 | 3/2016 | Hirotani et al. | |

FOREIGN PATENT DOCUMENTS

| | | |
|---|---|---|
| WO | WO2013084901 A1 | 6/2013 |
| WO | WO 2014/125568 A1 | 8/2014 |
| WO | WO2014180637 A2 | 11/2014 |

* cited by examiner

BRUSHLESS DIRECT CURRENT ELECTRIC MOTOR AND ELECTRIC POWER STEERING SYSTEM

CROSS REFERENCE TO RELATED APPLICATIONS

This non-provisional patent application claims priority under 35 U.S.C. § 119(a) from Patent Application No. 201410705241.6 filed in The People's Republic of China on Nov. 26, 2014, the entire contents of which are hereby incorporated by reference.

FIELD OF THE INVENTION

This invention relates to electric motors, and in particular, to a brushless direct current electric motor and an electric power steering system using the brushless direct current electric motor.

BACKGROUND OF THE INVENTION

Brushless direct current electric motors (BLDC motors) include a stator provided with windings, a rotor provided with permanent magnets, and a controller configured to supply power to the stator. The stator of a known BLDC motor includes a stator core, and windings wound around the stator core. The windings include M phase windings, each phase winding includes a plurality of parallel branches. When one branch of one phase winding is disconnected, an unbalance occurs between that phase winding and the other phase windings, which causes a high torque ripple of the electric motor, resulting in high vibration. Particularly, when a brushless direct current electric motor of a power steering system for steering a vehicle breaks down, if the driver turns the steering wheel, the windings may short circuit and generate a short circuit current, thereby generating a retarding torque to hinder the rotation of the steering wheel. Therefore, the known BLDC motor has a potential safety hazard.

SUMMARY OF THE INVENTION

Thus, there is a desire for an improved brushless direct current electric motor, especially for one suitable for a power steering system.

Accordingly, the present invention provides a BLDC motor, including a first sub-motor and a second sub-motor. The first sub-motor and the second sub-motor share a common rotor, and each includes an independent stator, which together form a combined stator. The stator of the first sub-motor includes a plurality of teeth and windings, and the stator of the second sub-motor includes a plurality of teeth and windings. The first sub-motor and the second sub-motor can cooperatively work as a single motor or operate independently. The teeth of the first sub-motor and the teeth of the second sub-motor are interleavingly arranged in a circumferential direction or arranged side by side in an axial direction.

Preferably, the BLDC motor is a two phase electric motor having Np rotor poles and Ns slots of the stator, wherein Np and Ns are even numbers, and $$\frac{Np}{Ns} = k - \frac{1}{2}, k = 1, 2, 3 \ldots .$$

Alternatively, the BLDC motor is a three phase electric motor having Np rotor poles and Ns slots of the stator Ns, and $$\frac{Np}{Ns} \neq \frac{1}{4}k, k = 1, 2, 3 \ldots ,$$

wherein Np is an even number, and Ns=6k, k=1, 2, 3, . . . .

Preferably, the teeth of the first sub-motor and the teeth of the second sub-motor are interleavingly and uniformly arranged along the circumferential direction. For example, the number of slots of the combined stator of the motor is twelve, and each of the first sub-motor and the second sub-motor comprises six teeth. The six teeth are divided into two U phase teeth, two V phase teeth, and two W phase teeth, and the two teeth having the same phase are symmetrically arranged and spaced 180 degrees apart. Alternatively, each two teeth having the same phase are spaced 90 degrees apart.

Preferably, the teeth of the first sub-motor and the teeth of the second sub-motor are interleavingly and non-uniformly arranged along a circumferential direction. For example, the number of slots of the combined stator is twelve, and each of the first sub-motor and the second sub-motor comprises six teeth, the six teeth are divided into two U phase teeth, two V phase teeth, and two W phase teeth. The two U phase teeth are spaced 180 degrees apart, the two V phase teeth are spaced 180 degrees apart, and the two W phase teeth are spaced 90 degrees apart. Alternatively, the two U phase teeth are spaced 180 degrees apart, the two V phase teeth are spaced 90 degrees apart, and the two W phase teeth are spaced 90 degrees apart.

Alternatively, the teeth of the first sub-motor are arranged adjacent one another and substantially form a half of an annulus, the teeth of the second sub-motor are arranged adjacent one another and substantially form the other half of the annulus. Preferably, the number of the slots of the stator of the brushless direct current electric motor is 12, and each of the first sub-motor and the second sub-motor comprises 6 teeth, the 6 teeth are divided into two U phase teeth, two V phase teeth, and two W phase teeth, every two teeth of the same phase are spaced 90 degrees apart.

Alternatively, the teeth of the first sub-motor are divided into two sets of teeth spaced apart, the teeth of each set are arranged adjacent one another circumferentially, the teeth of the second sub-motor are divided into two sets of teeth spaced apart, the teeth of each set are arranged adjacent one another circumferentially. Preferably, each set of teeth of the first sub-motor and the second sub-motor has a U phase tooth, a V phase tooth, and a W phase tooth.

Preferably, an n-th order harmonic waveform of a torque of the second sub-motor is shifted relative to an n-th order harmonic waveform of a torque of the first sub-motor by (2k+1)/2 period, wherein k=0, ±1, ±2, ±3 . . . .

Preferably, a standard position of the is defined as the position of the second sub-motor relative to the first sub-motor where a torque ripple produced by the second sub-motor is the same as a torque ripple produced by the first sub-motor, and the second sub-motor is rotated by a mechanical angle AO relative to the standard position in a circumferential direction to reduce the torque ripple of the electric motor.

Preferably, the angle $$\Delta\theta = \frac{180°}{nmNp}(2k+1),$$

where n represents an order of the harmonic wave to be improved, and m represents the number of phases of the electric motor.

Preferably, the first sub-motor and the second sub-motor are controlled by a single controller.

Preferably, the first sub-motor and the second sub-motor are respectively controlled by two controllers. The current of the two sub-motors has a phase difference, such that the n order harmonic waveform of a torque of the second sub-motor is shifted relative to the n order harmonic waveform of a torque of the first sub-motor by (2k+1)/2 period, wherein k=0, ±1, ±2, ±3 . . . .

The present invention further provides an electric power steering system that utilizes the above brushless direct current electric motor.

The first sub-motor and second sub-motor are configured such that they cooperatively work as a single motor to output normal power. In case of a failure of one of the sub-motors, the other sub-motor can independently operate, thus greatly enhancing the reliability and safety of the brushless direct current electric motor.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The BLDC motor according to the invention includes two sub-motors. The two sub-motors share a common rotor, and each includes an independent stator and independent input terminals. During normal operation of the electric motor, the two sub-motors work together as a single electric motor. If one of the two sub-motors breaks down, the other sub-motor can work independently to ensure reliability and safety of the electric motor. The electric motor according to the invention is especially suitable for an electric power steering system for steering a vehicle, but it is not limited to this specific application.

Figure 1:
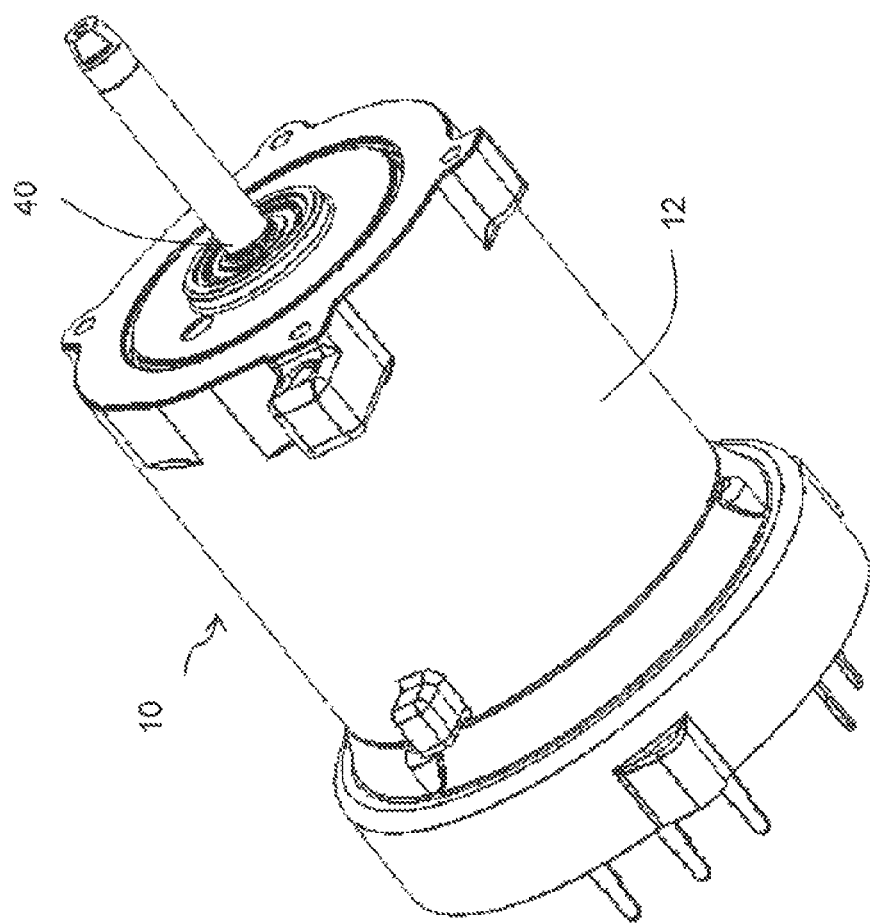
FIG. 1 is a perspective view of a brushless direct current electric motor of the invention.
Figure 2:
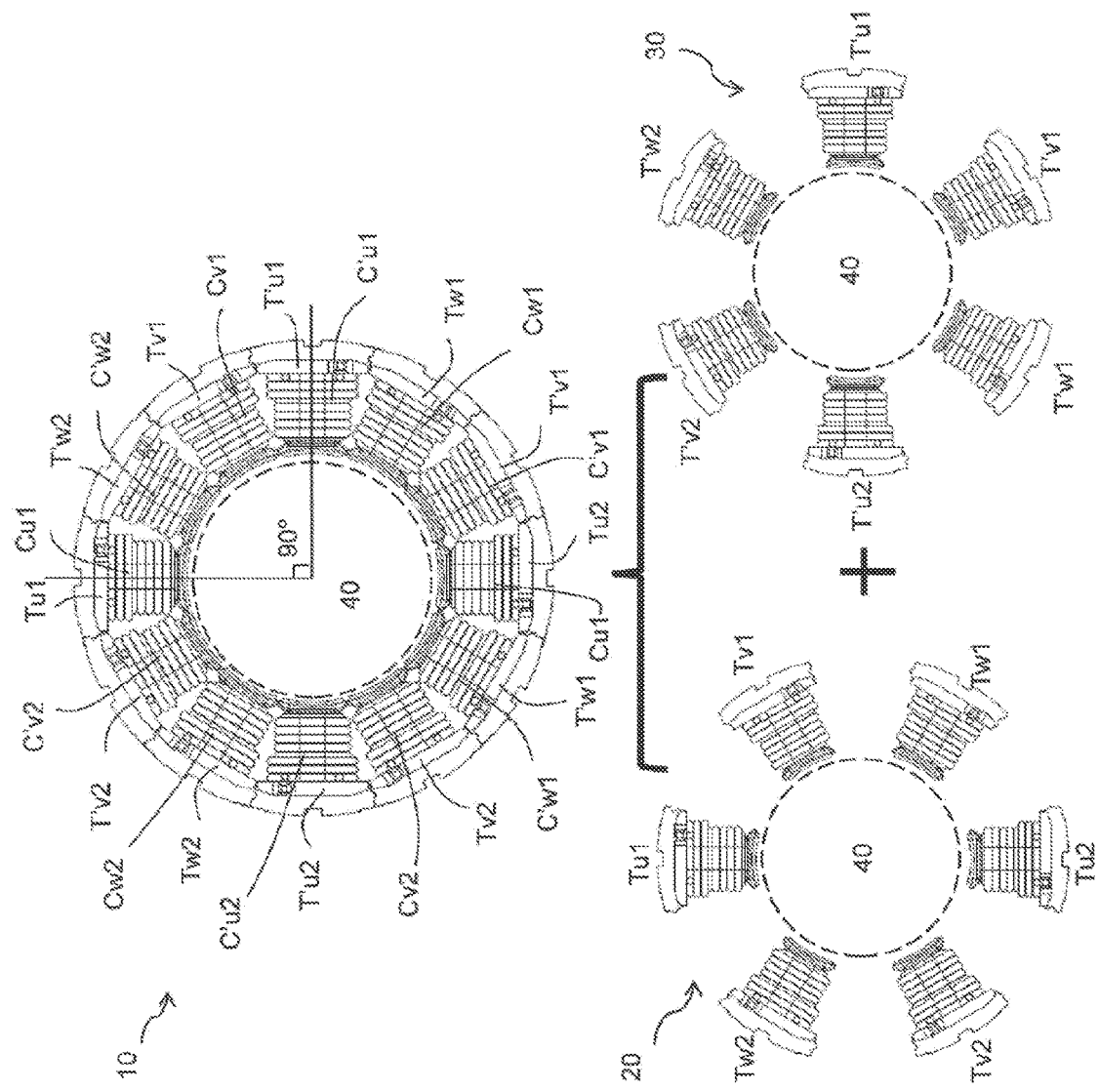
FIG. 2 is a schematic view of a stator of a BLDC motor of an embodiment of the invention.

Referring to FIG. 1 and FIG. 2, the electric motor 10 according to the embodiment, includes a housing 12, and a first sub-motor 20 and a second sub-motor 30 received in the housing 12. The first sub-motor 20 and the second sub-motor 30 share one rotor 40. The first sub-motor 20 includes several teeth and a plurality of windings respectively wound around the several teeth. The second sub-motor 30 includes several teeth and a plurality of windings respectively wound around the several teeth. The teeth of the first sub-motor 20 and the teeth of the second sub-motor 30 are alternatively arranged in a circumferential direction of the electric motor 10, and collectively constitute a stator of the electric motor 10.

In the embodiment, the first sub-motor 20 and the second sub-motor 30 are both three phase electric motors. The teeth and windings of the first sub-motor 20 each are divided into teeth and windings which correspond to U phase, V phase, and W phase. Specifically, the first sub-motor 20 includes U phase teeth Tu1 and Tu2, V phase teeth Tv1 and Tv2, W phase teeth Tw1 and Tw2, and corresponding U phase windings Cu1 and Cu2, V phase windings Cv1 and Cv2, and W phase windings Cw1 and Cw2. Similarly, the teeth and windings of the second sub-motor 30 are divided into teeth and windings which correspond to U phase, V phase, and W phase. Specifically, the second sub-motor 30 includes U phase teeth T'u1 and T'u2, V phase teeth T'v1 and T'v2, W phase teeth T'w1 and T'w2, and corresponding U phase windings C'u1 and C'u2, V phase windings C'y1 and C'v2, and W phase windings C'w1 and C'w2.

Teeth of the same phase of the first sub-motor 20 are symmetrically arranged and spaced 180 degrees apart. Teeth of the same phase of the second sub-motor 30 are also symmetrically arranged and spaced 180 degrees apart. Each tooth of the first sub-motor 20 and each tooth of the second sub-motor 30 are alternatively arranged, i.e. each tooth of the first sub-motor 20 is arranged between two teeth of the second sub-motor 30, and each tooth of the second sub-motor 30 is arranged between two teeth of the first sub-motor 20.

Figure 3B:
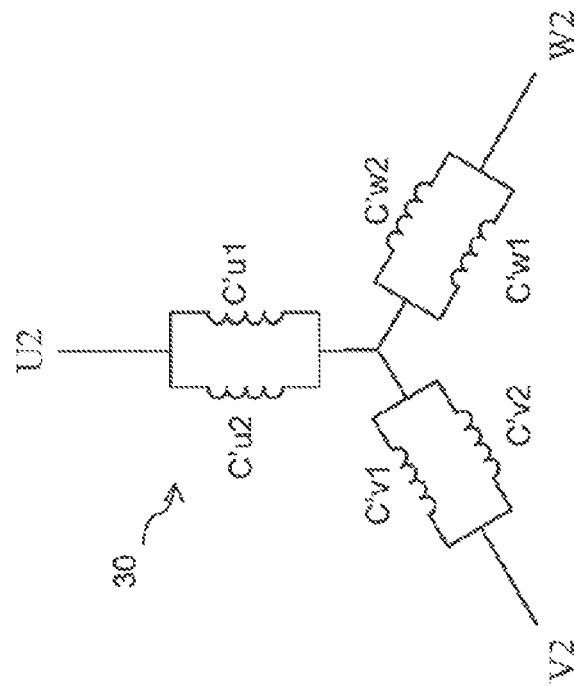
FIG. 3a and FIG. 3b are wiring schematic diagrams showing connections between winding circuits of a first sub-motor and a second sub-motor of the BLDC motor of FIG. 2.
Figure 3A:
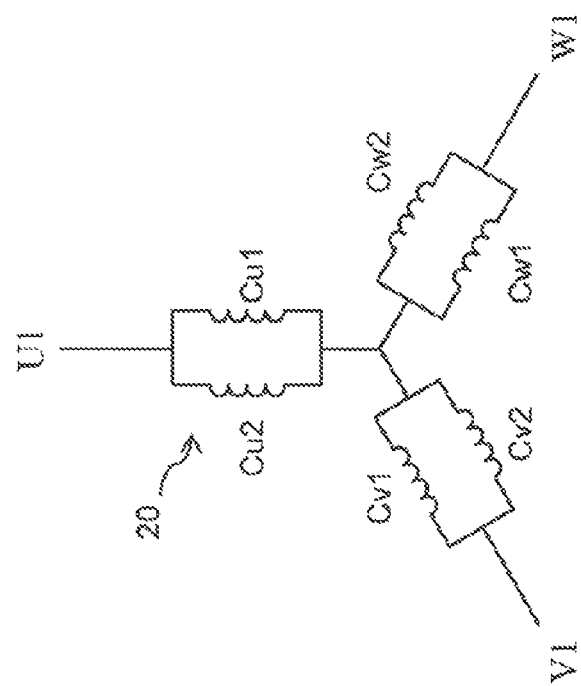

Referring to FIG. 3, the first sub-motor is provided with three input terminals, i.e. U1, V1, and W1. The second sub-motor is also provided with three input terminals, i.e. U2, V2, and W2. The input terminals of the first sub-motor and the input terminals of the second sub-motor are independent from each other. Therefore, the first sub-motor 20 and the second sub-motor 30 can either work together as a single electric motor 10, or work independently. During normal operation of the electric motor 10, the first sub-motor 20 and the second sub-motor 30 work simultaneously. If one sub-motor breaks down, for example, one winding experiences a short circuit or an open circuit, a controller will cut-off the power to the broken-down sub-motor to stop the broken-down sub-motor. At this time, the other sub-motor continues working and drives the load. Moreover, because the power of the broken-down sub-motor is cut-off and the broken-down sub-motor stops working, a huge torque ripple and a retarding torque resulted by the running of the broken-down electric motor can be avoided.

Figure 4:
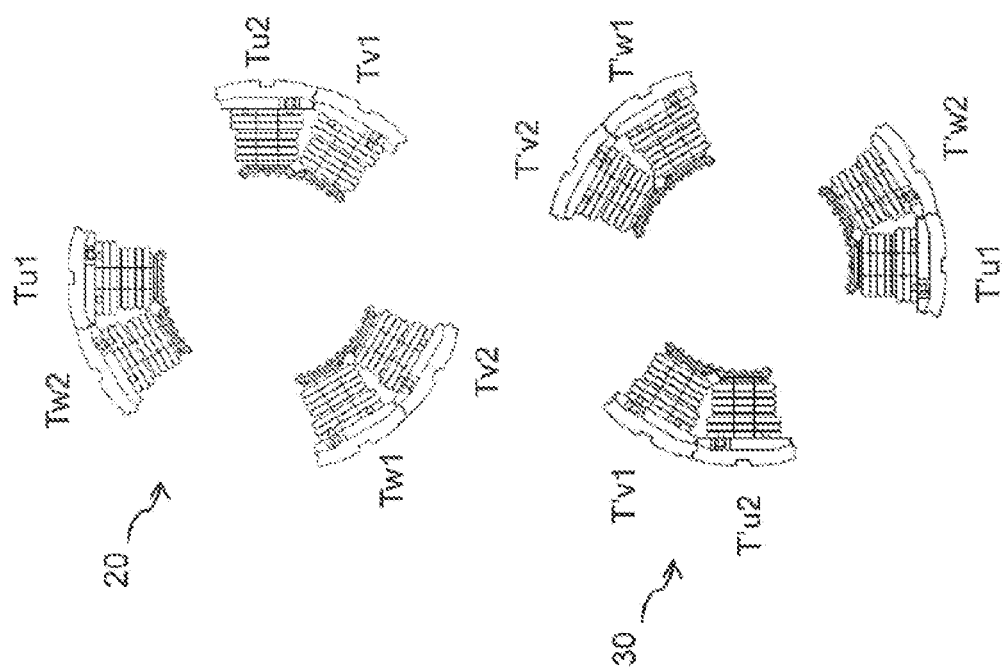
FIG. 4 is a schematic diagram of stators of a first sub-motor and a second sub-motor of a BLDC motor of an embodiment of the invention.

In above embodiment, teeth of the same phase of the first sub-motor 20 are distributed at an angular interval of 180 degrees. Teeth of the same phase of the second sub-motor 30 are also distributed at an angular interval of 180 degrees. In the alternative embodiment shown in FIG. 4, teeth of the same phase of the first sub-motor are positioned at an angular interval of 90 degrees. Teeth of the same phase of the second sub-motor are also positioned at an angular interval of 90 degrees.

Figure 5:
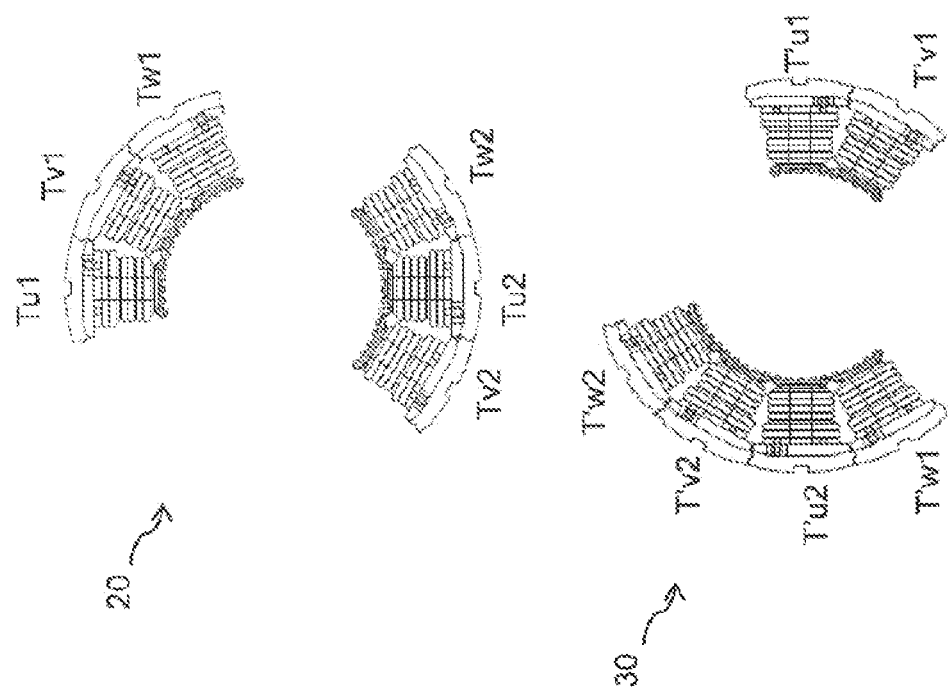
FIG. 5 is a schematic diagram of stators of a first sub-motor and a second sub-motor of a BLDC motor of another embodiment of the invention.

In the alternative embodiment shown in FIG. 5, the two U phase teeth of the first sub-motor are spaced 180 degrees apart. The two V phase teeth of the first sub-motor are spaced 180 degrees apart. The two W phase teeth of the first sub-motor are spaced 90 degrees apart. The two U phase teeth of the second sub-motor are spaced 180 degrees apart. The two V phase teeth of the second sub-motor are spaced 180 degrees apart. The two W phase teeth of the second sub-motor are spaced 90 degrees apart.

Figure 6:
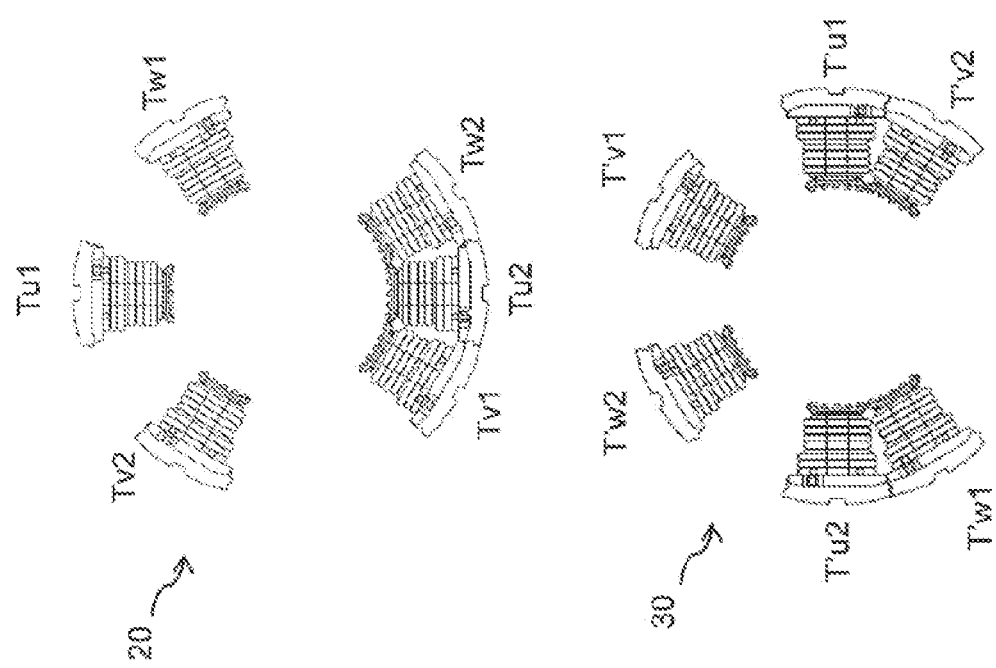
FIG. 6 is a schematic diagram of stators of a first sub-motor and a second sub-motor of a brushless direct current electric motor of a further embodiment of the invention.

In the alternative embodiment shown in FIG. 6, the two U phase teeth of the first sub-motor are spaced 180 degrees apart. The two V phase teeth of the first sub-motor are spaced 90 degrees apart. The two W phase teeth of the first sub-motor are spaced 90 degrees apart. The two U phase teeth of the second sub-motor are spaced 180 degrees apart. The two V phase teeth of the second sub-motor are spaced 90 degrees apart. The two W phase teeth of the second sub-motor are spaced 90 degrees apart.

Figure 7:
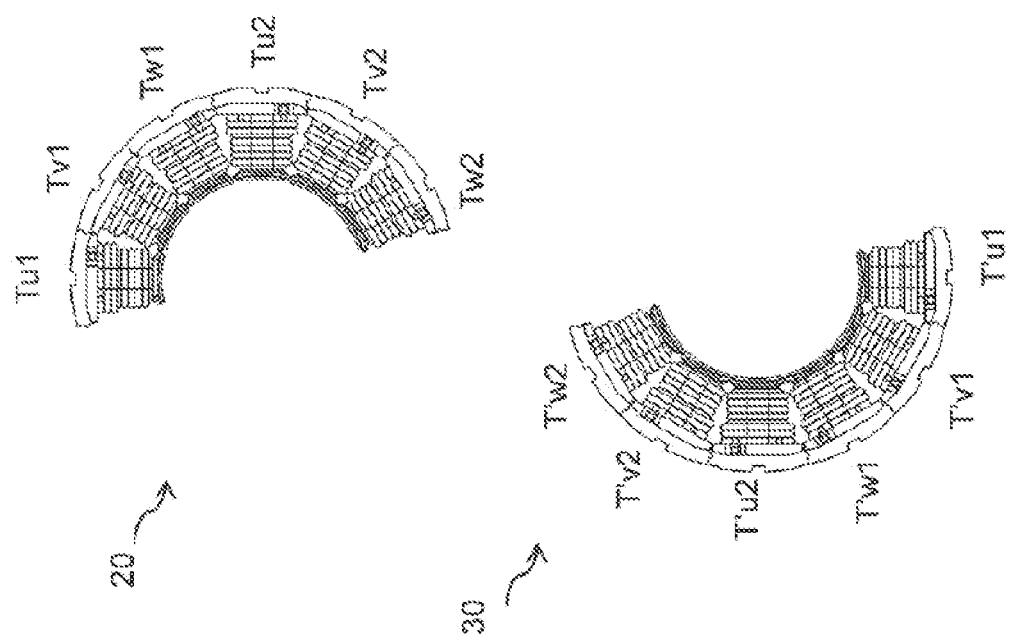
FIG. 7 is a schematic diagram of stators of a first sub-motor and a second sub-motor of a BLDC motor of yet another embodiment of the invention.

In an another alternative embodiment shown in FIG. 7, the six teeth of the first sub-motor are arranged adjacent to each other circumferentially and substantially form half of an annulus. Every two teeth of the same phase of the first sub-motor are spaced 90 degrees apart. The six teeth of the second sub-motor are arranged adjacent to each other circumferentially and substantially form the other half of the annulus. Every two teeth of the same phase of the second sub-motor are also spaced 90 degrees apart.

Figure 8:
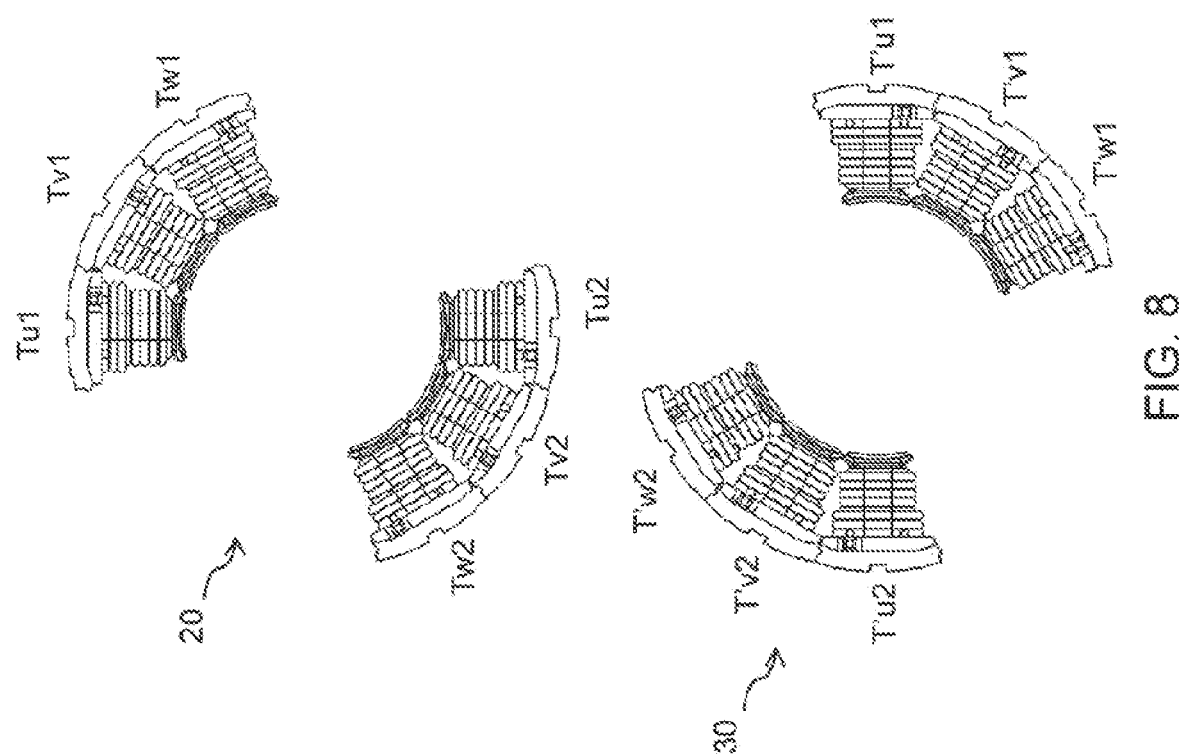
FIG. 8 is a schematic diagram of stators of a first sub-motor and a second sub-motor of a BLDC motor of a further embodiment of the invention.

FIG. 8 shows an alternative embodiment of the present invention. In this embodiment, the first sub-motor includes two sets of teeth, each set of teeth includes an U phase tooth, a V phase tooth and a W phase tooth arranged adjacent to each other circumferentially. The two sets of teeth are spaced apart. The two teeth of the same phase of the first sub-motor are spaced 180 degrees apart. The second sub-motor includes two sets of teeth, each set of teeth includes an U phase tooth, a V phase tooth and a W phase tooth arranged adjacent to each other circumferentially. The two sets of teeth of the second sub-motor are spaced apart. The two teeth of the same phase of the second sub-motor are also spaced 180 degrees apart.

In above embodiment, the teeth of the first sub-motor and the teeth of the second sub-motor are arranged in a circumferential direction. In the electric motor according to an embodiment of FIG. 9, the first sub-motor and the second sub-motor are arranged side by side in an axial direction. The first sub-motor includes 12 teeth Tu1-Tu4, Tv1-Tv4, Tw1-Tw4, and 12 windings wound around the teeth respectively. The second sub-motor includes 12 teeth Tu1-Tu4, Tv1-Tv4, Tw1-Tw4, and 12 windings wound around the teeth respectively. The first sub-motor and the second sub-motor are coaxially arranged side by side in the axial direction.

Figure 9:
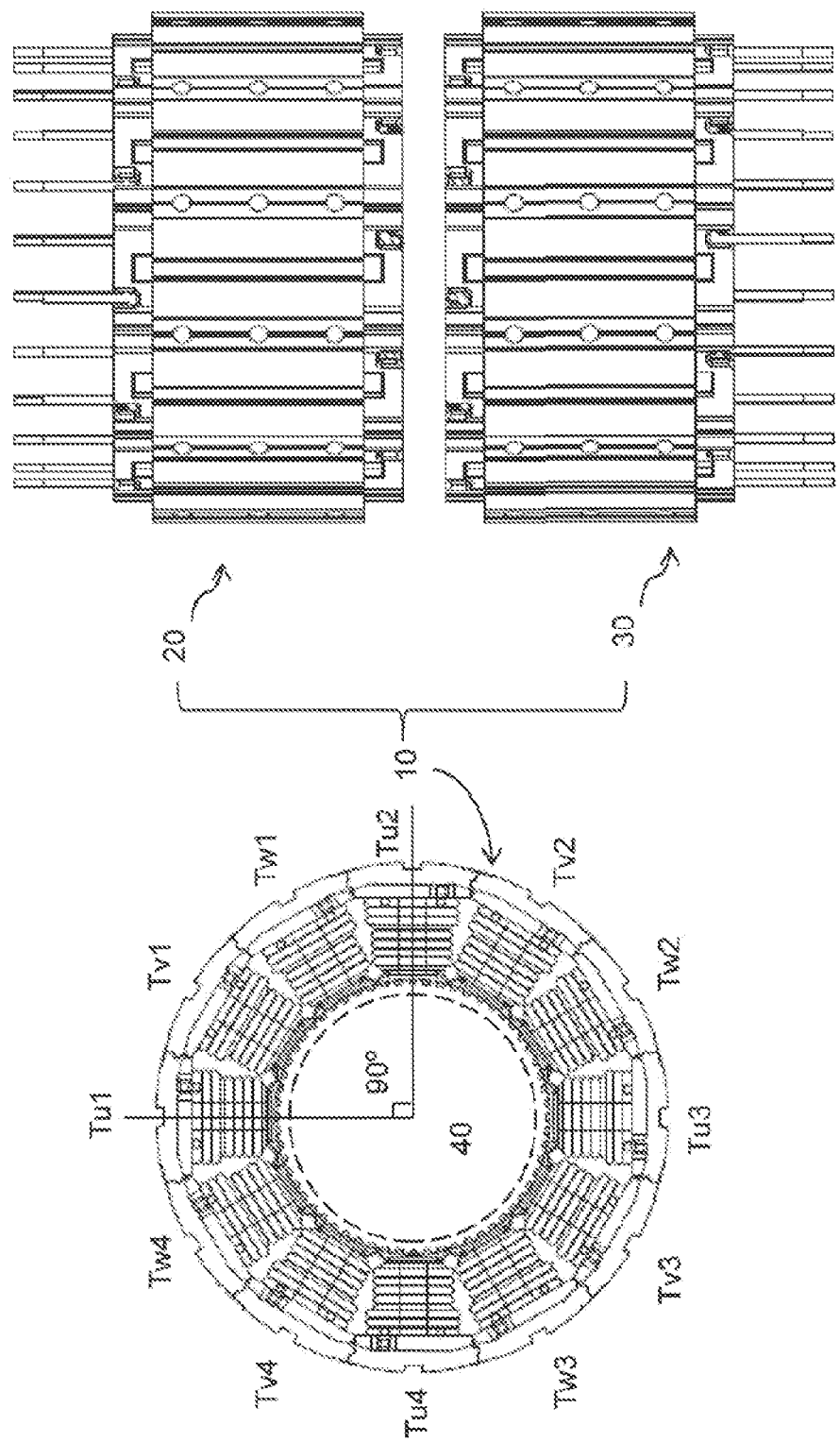
FIG. 9 is a schematic view of a stator of a BLDC motor of an embodiment of the invention.
Figure 10:
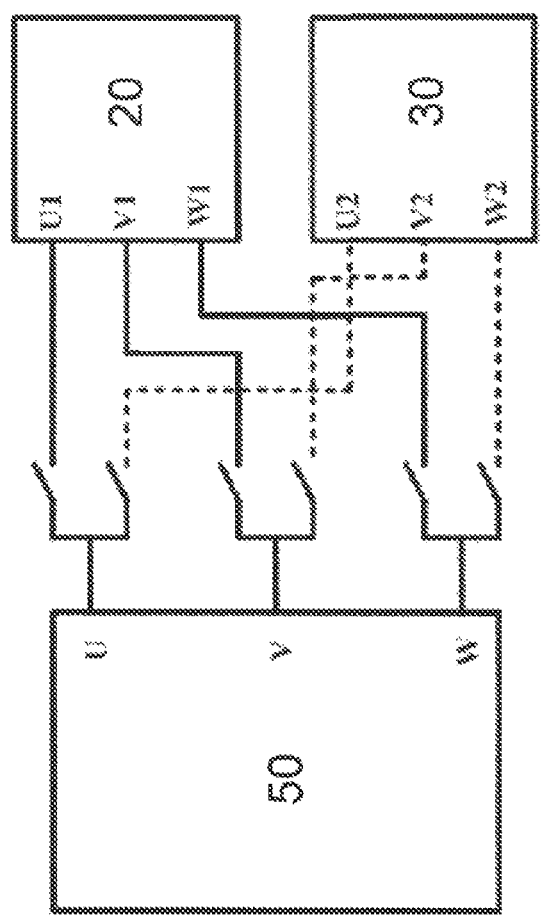
FIG. 10 is a block diagram of a brushless direct current electric motor of an embodiment of the invention, controlled by a controller.
Figure 11:
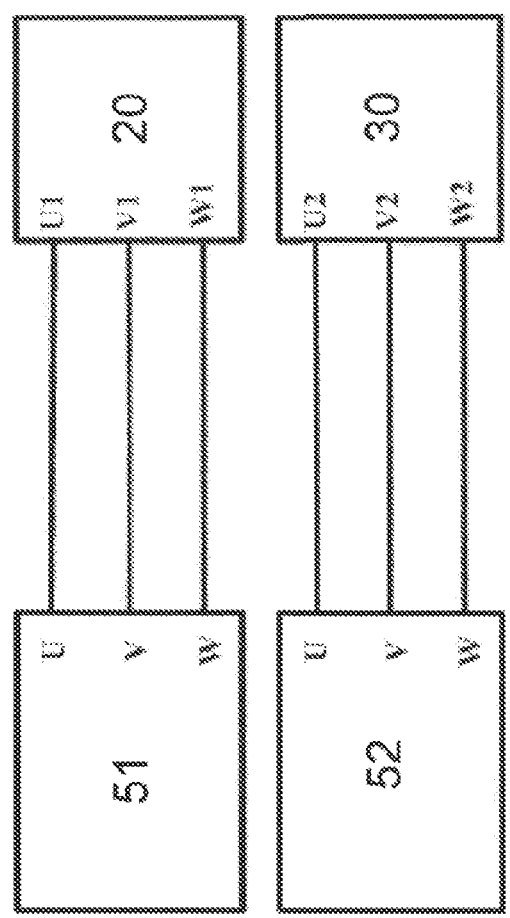
FIG. 11 is a block diagram of a brushless direct current electric motor of an embodiment of the invention, controlled by two controllers.

Referring to FIG. 10 and FIG. 11, the first sub-motor and the second sub-motor of the electric motor according to the invention can be controlled by a single controller 50 (as shown in FIG. 10). In this case, each output terminal of the controller 50 is electrically connected to corresponding input terminals of the first sub-motor 20 and the second sub-motor 30 via two switches. In an alternative solution, the first sub-motor 20 and the second sub-motor 30 of the electric motor 10 can also be controlled by two controllers 51, 52 (as shown in FIG. 9) respectively. In this case, the output terminals of each of the two controllers 51, 52 are connected to corresponding input terminals of one sub-motor respectively.

Although above embodiments are illustrated with reference to a three phase electric motor, other types of brushless direct current electric motors may also implement the present invention as long as the following equations are satisfied.

Figure 17:
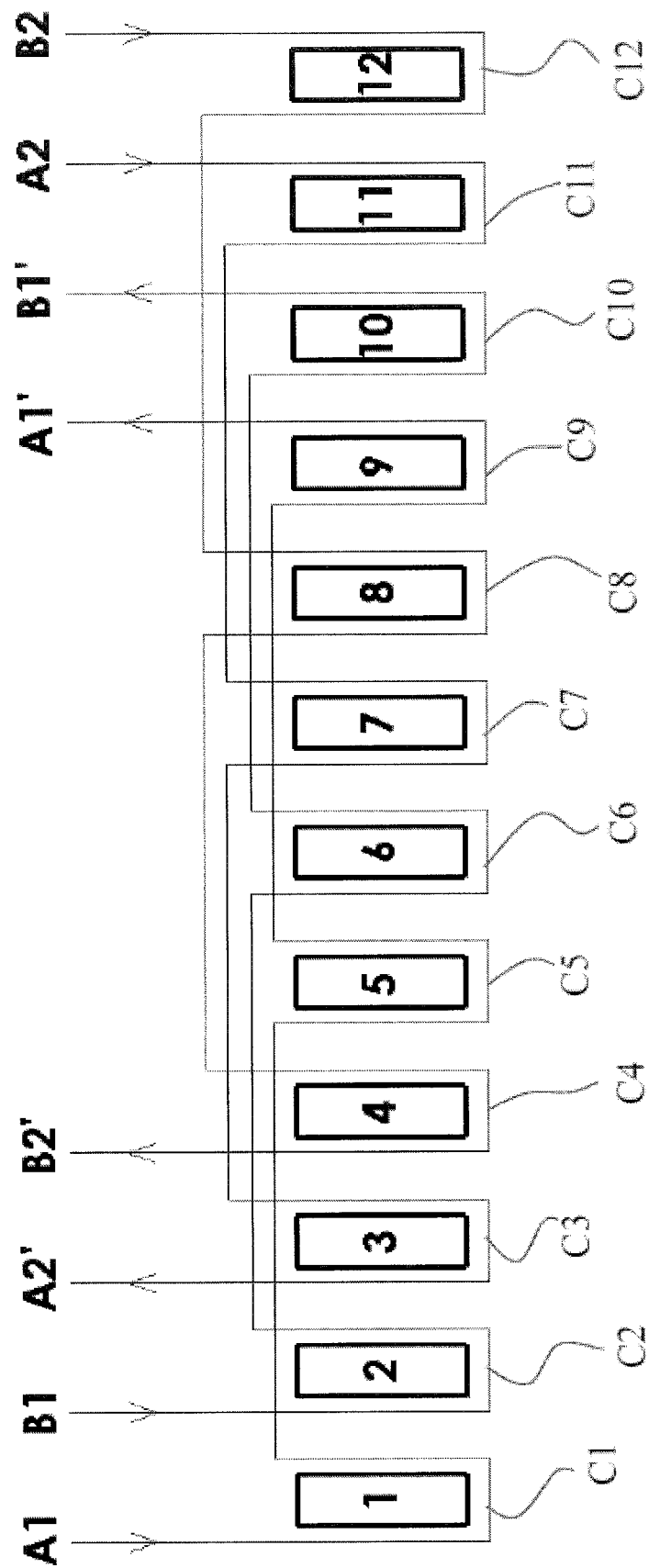
FIG. 17 is a schematic winding diagram for a two phase electric motor.

FIG. 17 shows a schematic winding diagram for a two phase electric motor. Rectangular blocks indicate 12 teeth of the stator of the two electric motor. In one embodiment, the two phase motor includes a first sub-motor with phases A1-A1' and B1-B1', and a second sub-motor with phases A2-A2' and B2-B2'. The phase A1-A1' includes windings C1, C5 and C9 connected in series. The phase B1-B1' includes windings C2, C6 and C8 connected in series. The phase A2-A2' includes winding C11, C7 and C3 connected in series. The phase B2-B2' includes windings C12, C8 and C4 connected in series. For the two phase electric motor, the following equation should be met:

$$\frac{Np}{Ns} = k - \frac{1}{2}, k = 1, 2, 3 \ldots$$

wherein Np represents the number of rotor poles and Ns represents the number of slots of the stator, and Np and Ns both are even numbers.

For a three phase electric motor, the following relationship should be met, $$\frac{Np}{Ns} \neq \frac{1}{4}k, k = 1, 2, 3 \ldots$$

wherein Np represents the number of rotor poles and is an even number, and Ns represents the number of slots of the stator, and wherein Ns=6k, k=1, 2, 3 . . . .

Figure 12A:
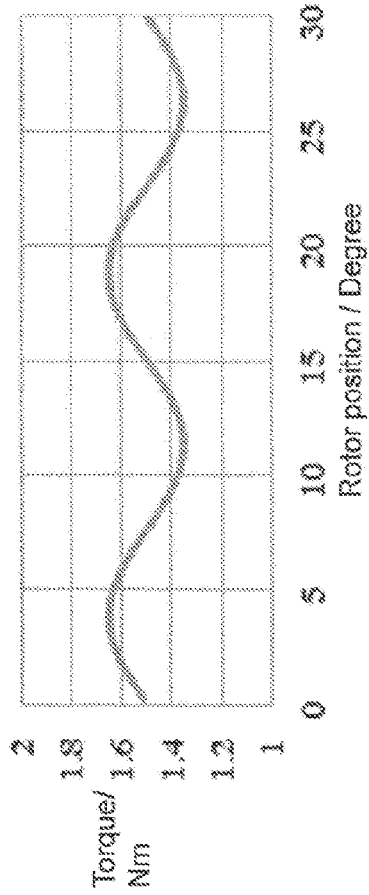
FIG. 12a and FIG. 12b are primary harmonic waveforms of torques of a first sub-motor and a second sub-motor of the brushless direct current electric motor of FIG. 2.
Figure 12B:
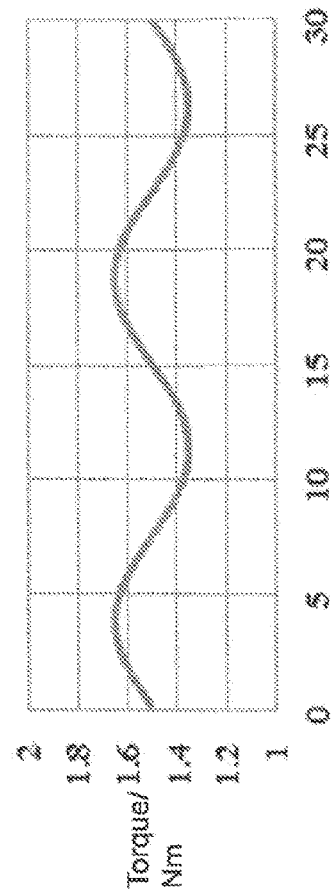
Figure 12C:
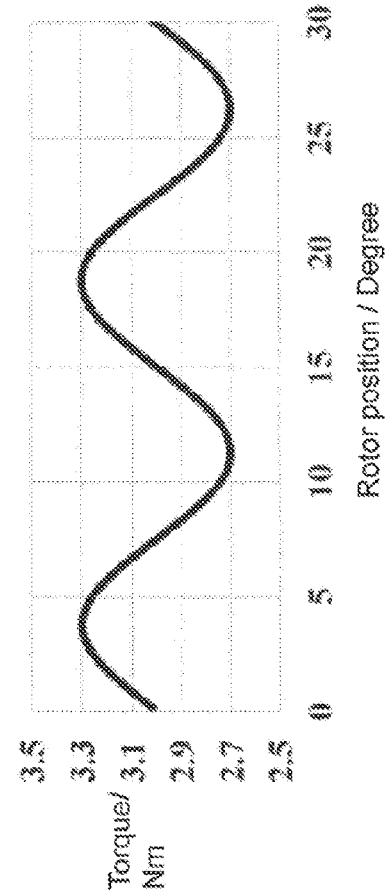
FIG. 12c is a synthesis waveform of the torque waveforms of FIG. 12a and FIG. 12b.

In the embodiments of FIGS. 1 through 7, a mechanical angle difference between the winding of the first sub-motor and the winding of the second sub-motor which have the same phase is an integral multiple of 90 degrees. Therefore, an electric angle difference is equal to the mechanical angle difference multiplied by the number of pole pairs, i.e. an integral multiple of 360 degrees. Therefore, back EMF (Electromotive Force) waveforms of the first sub-motor and the second sub-motor are the same. In the case that one controller controls the two sub-motors that simultaneously work as one electric motor, the currents supplied to the two sub-motors by the controller are the same. Thus, the torque waveforms of the two sub-motors are the same. FIG. 12a and FIG. 12b respectively illustrate primary harmonic waveforms (fundamental waveform) of torques of the first sub-motor and the second sub-motor. FIG. 12c illustrates a primary harmonic waveform of a synthesis torque of the first sub-motor and the second sub-motor, i.e. a primary harmonic waveform of a torque of the electric motor 10. FIG. 12c shows that the torque ripple of the electric motor 10 is relatively high.

Figure 13A:
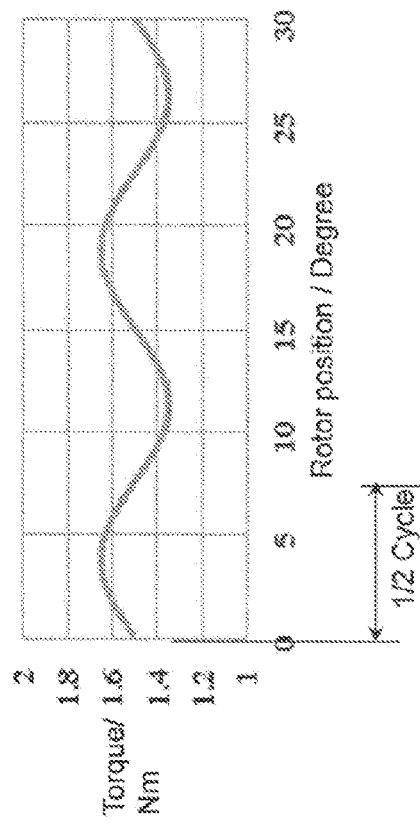
FIG. 13a and FIG. 13b are primary harmonic waveforms of torques of a first sub-motor and a second sub-motor of a brushless direct current electric motor of another embodiment.
Figure 13B:
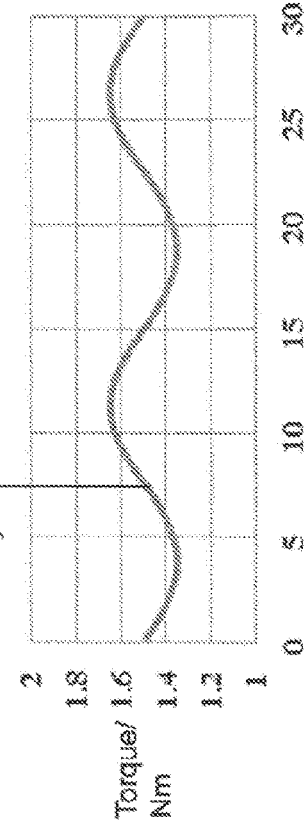
Figure 13C:
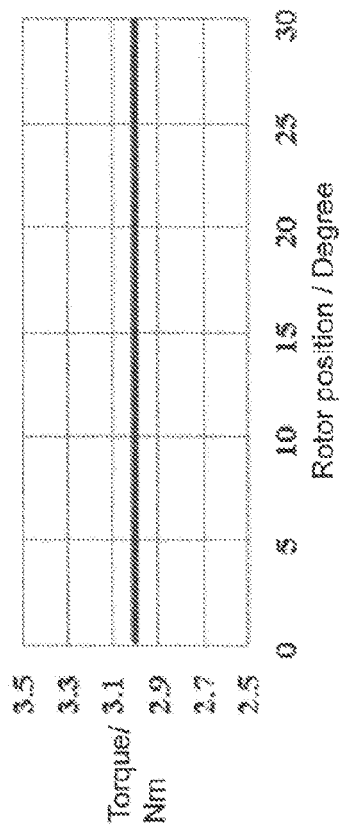
FIG. 13c is a synthesis waveform of the torque waveforms of FIG. 13a and FIG. 13b.

In order to improve a waveform of a certain order harmonic wave of the torque of the electric motor 10, reduce the torque ripple of the running electric motor 10, and enhance stability of the running electric motor 10, the invention proposes to shift that order harmonic wave of the torque of the second sub-motor relative to that order harmonic wave of the torque of the first sub-motor by (2k+1)/2 period, where k=0, ±1, ±2, ±3 . . . , that when the two sub-motors work cooperatively as one electric motor, the same order harmonic waves of the torque of the two sub-motors overlap to form a flat line, minimizing a torque ripple, thereby making the electric motor 10 run more stably. FIG. 13a and FIG. 13b respectively illustrate the primary harmonic waveforms (i.e. base wave) of the torque of the first sub-motor and the second sub-motor. FIG. 13c illustrates the primary harmonic waveform of the synthesis torque of the improved first sub-motor and second sub-motor, i.e. the primary harmonic waveform of the torque of the improved electric motor 10. It can be seen from FIG. 13c that the primary harmonic wave of the torque of the improved electric motor 10 is flat, and torque ripple is minimized.

Figure 14:
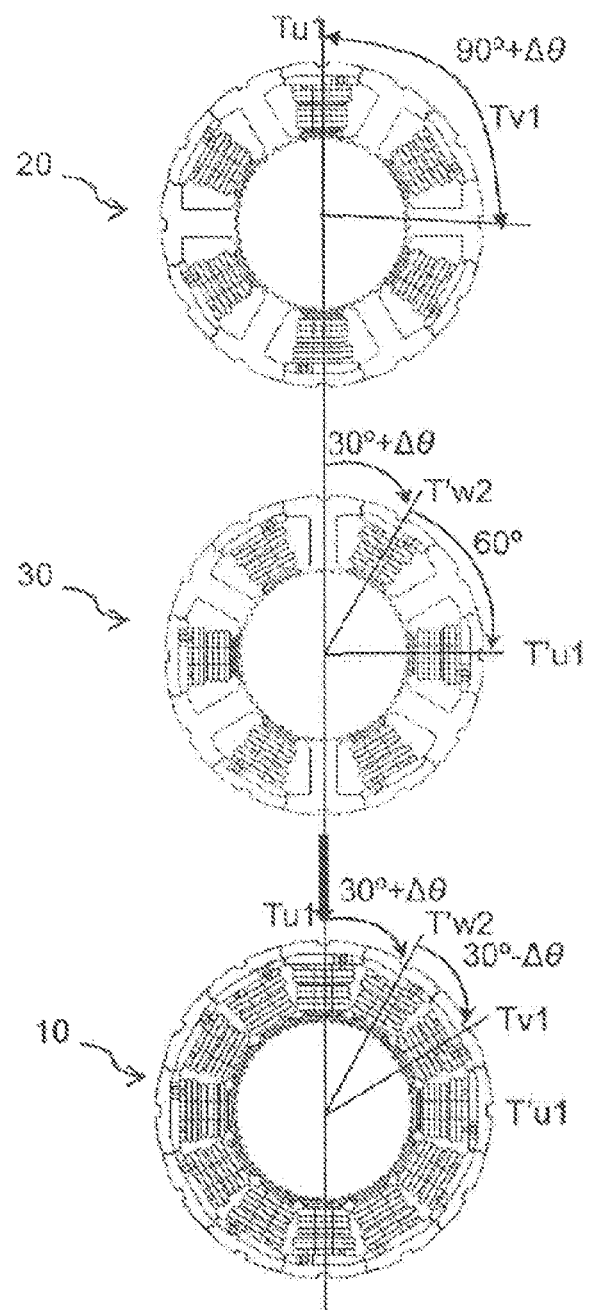
FIG. 14 is a schematic view of a stator of a brushless direct current electric motor of another embodiment of the invention.

Specifically, the embodiment illustrated in FIG. 14 is an improvement over the electric motor illustrated in FIG. 2. If the position of the second sub-motor relative to the first sub-motor of FIG. 2, i.e. a position in which the torque ripple produced by the second sub-motor is the same as the torque ripple produced by the first sub-motor, is defined as a standard position, the position of the second sub-motor of this embodiment is rotated a mechanical angle Δθ relative to the standard position, such that an n-th order harmonic wave of a torque produced by the second sub-motor is shifted relative to the same order harmonic wave of a torque produced by the first sub-motor by (2k+1)/2 period. Specifically, $$\Delta\theta = \frac{180°}{nmNp}(2k+1),$$

where, k=0, ±1, ±2, ±3 . . . , n represents the order of the harmonic wave to be improved, m represents the phase number of the electric motor 10, Np represents the number of the rotor poles. Specifically, for a 3-phase and 8-pole electric motor 10, if the primary harmonic waveform of the torque of the electric motor 10 is to be improved, thus $$\Delta\theta = \frac{180°}{1 \times 3 \times 8}(2 \times 0 + 1) = 7.5°$$

should be met.

Figure 15:
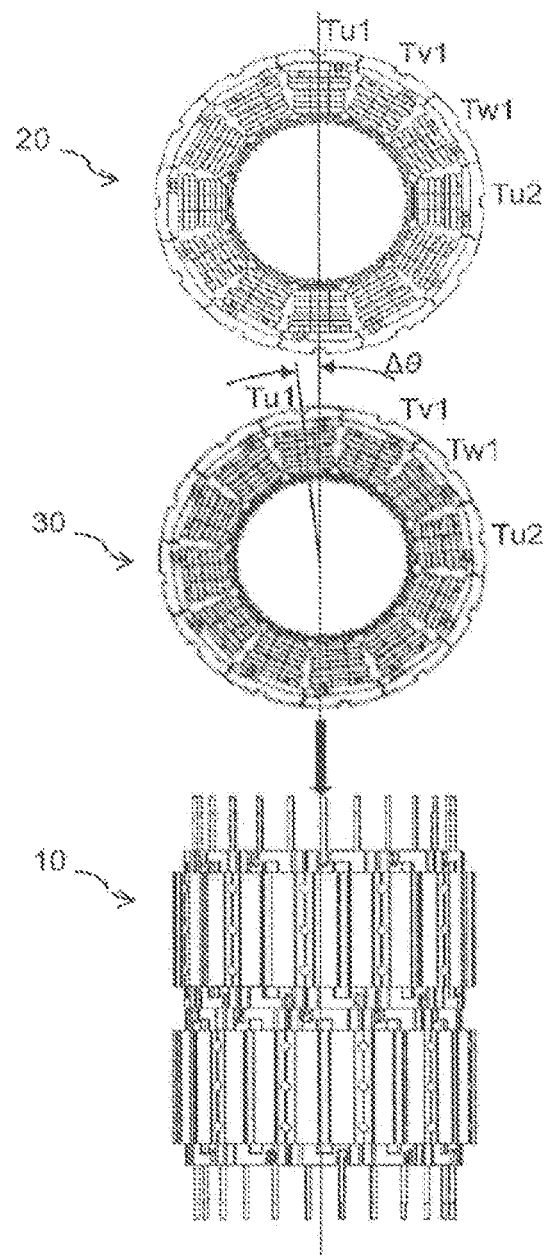
FIG. 15 is a schematic view of a stator of a brushless direct current electric motor of another embodiment of the invention.

The embodiment illustrated in FIG. 15 is an improvement over the electric motor shown in FIG. 9. If the position of the second sub-motor relative to the first sub-motor of FIG. 9, i.e. a position in which the torque ripple produced by the second sub-motor is the same as the torque ripple produced by the first sub-motor, is defined as a standard position, the position of the second sub-motor of this embodiment is rotated by a mechanical angle Δθ relative to the standard position in a circumferential direction. Because the standard position of the second sub-motor is aligned with the first sub-motor in the axial direction, this embodiment can be considered that, the position of the second sub-motor is rotated an angle Δθ relative to the first sub-motor in the circumferential direction. As a result, an n-th order harmonic wave of the torque produced by the second sub-motor is shifted relative to the same order harmonic wave of the torque of the first sub-motor by (2k+1)/2 period. Specifically, $$\Delta\theta = \frac{180°}{nmNp}(2k+1),$$

where k=0, ±1, ±2, ±3 . . . , n represents the order of the harmonic wave to be improved, m represents the number of phases of the electric motor 10, and Np represents the number of rotor poles.

In fact, in the embodiments according to FIG. 14 and FIG. 15, the counter EMF waveforms of the second sub-motor are changed by changing the positions of the second sub-motor, thereby adjusting a synthesis torque waveform of the first sub-motor and the second sub-motor. When the first sub-motor and the second sub-motor are controlled by two controllers respectively, they can be controlled to achieve a phase difference of (2k+1)/2 period of the currents of the two sub-motors while ensuring the same phase of the counter EMF of the two sub-motors, thereby improving a certain order harmonic wave of the synthesis torque of the two sub-motors and hence making the electric motor run more stably.

Figure 16:
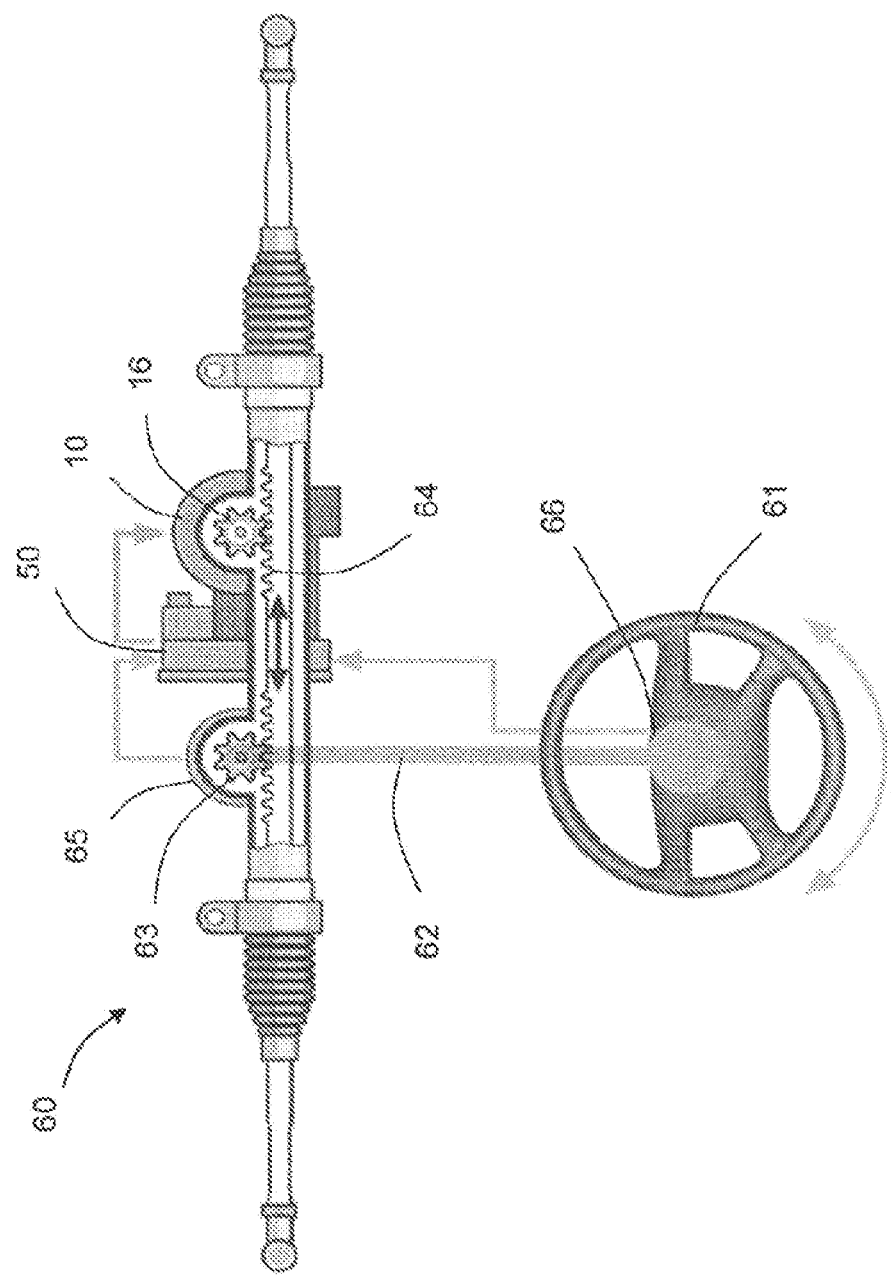
FIG. 16 is a schematic view of an electric power steering system using an electric motor of the invention.

FIG. 16 is a schematic view of an electric power steering system 60 using the electric motor 10 of the invention. The electric power steering system 60 includes a steering wheel 61, a steering column 62 fixed to the steering wheel 61, and a steering gear 63 coaxially fixed to the steering column 62. A rotary shaft of the electric motor 10 is drivingly connected to a driving gear 16 to output a torque of the electric motor 10. The driving gear 16 is drivingly connected to the steering gear 63 via a steering rack 64. Therefore, when the electric motor 10 operates, the driving gear 16 rotates to assist the driver to move the steering rack 64 to steer the vehicle. Movement of the steering wheel by the drive is inputted to the controller 50 to control operation of the electric motor 10. The electric power steering system 60 further includes a steering torque transducer 65 and a steering wheel angle sensor 66 configured to sense signals indicating an amount and direction of the torque of the steering wheel 61, and transfer the signals to the controller 50. The controller 50 transmits a corresponding command to the electric motor 10 according to the signals, enabling the electric motor 10 to output a steering torque having corresponding amount and direction, thereby generating an assisting power. When it is implemented in practice, a reduction mechanism can be provided between the electric motor 10 and the driving gear 16 to increase the output torque.

In one embodiment, the steering system is arranged to assist the driver to steer the vehicle by providing assisting torque to reduce the force required by the driver to move the steering rack via the steering wheel and steering column. In an alternative embodiment, the driver uses the steering wheel to input steering directions to the controller to operate the electric motor to drive the steering rack in accordance with the drivers input.

In the description and claims of the present application, each of the verbs "comprise", "include", "contain" and "have", and variations thereof, are used in an inclusive sense, to specify the presence of the stated item but not to exclude the presence of additional items.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A brushless direct current electric motor, comprising:
a first sub-motor; and
a second sub-motor,
wherein the first sub-motor and the second sub-motor share a common rotor, and each comprises an independent stator which together form a combined stator of the electric motor, the stator of the first sub-motor comprises a plurality of teeth and a plurality of windings, the stator of the second sub-motor comprises a plurality of teeth and a plurality of windings, the plurality of the windings of the first and the second sub-motors respectively form star-connection; the teeth of the first sub-motor and the teeth of the second sub-motor are interleavingly arranged in a circumferential direction or arranged side by side in an axial direction, the first sub-motor and the second sub-motor are configured to work as a single electric motor to output a normal power, and when one of the two sub-motors breaks down, the other sub-motor is capable of working independently, and
wherein the first sub-motor and the second sub-motor are respectively controlled by two controllers, the currents of the two sub-motors have a phase difference, such that the n-th order harmonic waveform of a torque of the second sub-motor is shifted relative to the n-th order harmonic waveform of a torque of the first sub-motor by (2k+1)/2period, wherein k=0, ±1, ±2, ±3 . . . .

2. The brushless direct current electric motor of claim 1, wherein the brushless direct current electric motor is a two phase electric motor, and the following equation is satisfied:

$$\frac{Np}{Ns} = k - \frac{1}{2}, k = 1, 2, 3 \ldots$$

wherein Np represents the number of rotor poles, Ns represents the number of slots of the combined stator, and Np and Ns are even numbers.

3. The brushless direct current electric motor of claim 1, wherein the brushless direct current electric motor is a three phase electric motor, and the following equation is satisfied, $$\frac{Np}{Ns} \neq \frac{1}{4}k, k = 1, 2, 3 \ldots$$

wherein Np represents the number of rotor poles and is an even number, and Ns represents the number of slots of the combined stator, Ns=6k, k=1,2,3 . . . .

4. The brushless direct current electric motor of claim 1, wherein the teeth of the first sub-motor and the teeth of the second sub-motor are interleavingly and uniformly arranged in the circumferential direction.

5. The brushless direct current electric motor of claim 4, wherein the combined stator has twelve slots, and each of the first sub-motor and the second sub-motor comprises six teeth, the six teeth are divided into two U phase teeth, two V phase teeth, and two W phase teeth, the two teeth of the same phase are symmetrically arranged and spaced 180 degrees apart.

6. The brushless direct current electric motor of claim 4, wherein the combined stator has twelve slots, and each of the first sub-motor and the second sub-motor comprises six teeth, the six teeth are divided into two U phase teeth, two V phase teeth, and two W phase teeth, the two teeth of the same phase are spaced 90 degrees apart.

7. The brushless direct current electric motor of claim 4, wherein the teeth of the first sub-motor are arranged adjacent one another and substantially form a half of an annulus, the teeth of the second sub-motor are arranged adjacent one another and substantially form the other half of the annulus.

8. The brushless direct current electric motor of claim 7, wherein the combined stator has twelve slots, and each of the first sub-motor and the second sub-motor comprises six teeth, the six teeth are divided into two U phase teeth, two V phase teeth, and two W phase teeth, the two teeth of the same phase are spaced 90 degrees apart.

9. The brushless direct current electric motor of claim 4, wherein the teeth of the first sub-motor are divided into two sets of teeth circumferentially spaced apart, the teeth of each set are arranged adjacent one another circumferentially, the teeth of the second sub-motor are divided into two sets of teeth circumferentially spaced apart, the teeth of each set are arranged adjacent one another circumferentially.

10. The brushless direct current electric motor of claim 9, wherein each set of teeth of the first sub-motor and the second sub-motor comprises a U phase tooth, a V phase tooth, and a W phase tooth.

11. The brushless direct current electric motor of claim 1, wherein the teeth of the first sub-motor and the teeth of the second sub-motor are interleavingly and non-uniformly arranged in the circumferential direction.

12. The brushless direct current electric motor of claim 11, wherein the combined stator has twelve slots, and each of the first sub-motor and the second sub-motor comprises six teeth, the six teeth are divided into two U phase teeth, two V phase teeth, and two W phase teeth, the two U phase teeth are spaced 180 degrees apart, the two V phase teeth are spaced 180 degrees apart, and the two W phase teeth are spaced 90 degrees apart.

13. The brushless direct current electric motor of claim 11, wherein the combined stator has twelve slots, and each of the first sub-motor and the second sub-motor comprises six teeth, the six teeth are divided into two U phase teeth, two V phase teeth, and two W phase teeth, the two U phase teeth are spaced 180 degrees apart, the two V phase teeth are spaced 90 degrees apart, and the two W phase teeth are spaced 90 degrees apart.

14. The brushless direct current electric motor of claim 1, wherein a standard position of the second sub-motor is defined as the position of the second sub-motor relative to the first sub-motor when a torque ripple produced by the second sub-motor is the same as a torque ripple produced by the first sub-motor, and the second sub-motor is rotated by a mechanical angle Δθ relative to the standard position in a circumferential direction to reduce the torque ripple of the electric motor.

15. The brushless direct current electric motor of claim 14, wherein $$\Delta\theta = \frac{180°}{nmNp}(2k+1),$$

wherein, k=0, ±1, ±2, ±3 . . . , n represents an order of the harmonic wave to be improved, and m represents the number of phases of the electric motor.

16. An electric power steering system, comprising:
a steering wheel;
a steering column fixed to the steering wheel;
a steering gear fixed to the steering column; and
an electric motor drivingly connected to the steering gear, wherein the electric motor is a brushless direct current electric motor comprising:
a first sub-motor; and
a second sub-motor,
wherein the first sub-motor and the second sub-motor share a common rotor, and each comprises an independent stator, the stator of the first sub-motor comprises a plurality of teeth and a plurality of windings, the stator of the second sub-motor comprises a plurality of teeth and a plurality of windings, the plurality of the windings of the first and the second sub-motors respectively form star-connection; the teeth of the first sub-motor and the teeth of the second sub-motor are interleavingly arranged in a circumferential direction or arranged side by side in an axial direction, the first sub-motor and the second sub-motor are configured to work as a single electric motor to output a normal power, when one of the two sub-motors breaks down, the other sub-motor is capable of working independently to enhance reliability and safety of the brushless direct current electric motor, and
wherein the first sub-motor and the second sub-motor are respectively controlled by two controllers, the currents of the two sub-motors have a phase difference, such that the n-th order harmonic waveform of a torque of the second sub-motor is shifted relative to the n-th order harmonic waveform of a torque of the first sub-motor by (2k+1)/2 period, wherein k=0, ±1, ±2, ±3 . . . .

17. The electric power steering system of claim 16, wherein an n-th order harmonic waveform of a torque of the second sub-motor is shifted relative to an n order harmonic waveform of a torque of the first sub-motor by (2k+1)/2 period, wherein k=0, ±1, ±2, ±3 . . . .

18. An electric power steering system for a vehicle, comprising:
a steering wheel;
a steering mechanism arranged to steer the vehicle;
an electric motor drivingly connected to the steering mechanism: and
at least one controller for controlling the electric motor, wherein the steering wheel provides an input to the at least one controller, and the electric motor is a brushless direct current electric motor as defined in claim 1.

* * * * *